United States Patent [19]
Bonham

[11] 3,930,355
[45] Jan. 6, 1976

[54] MELON HARVESTER

[76] Inventor: Herbert C. Bonham, 391 S. Sixth St., Blythe, Calif. 92225

[22] Filed: Nov. 4, 1974

[21] Appl. No.: 520,787

[52] U.S. Cl............................................. 56/327 R
[51] Int. Cl.² ........................................ A01D 51/00
[58] Field of Search........ 56/327 R, 328 R; 214/356

[56] References Cited
UNITED STATES PATENTS

| | | | |
|---|---|---|---|
| 3,292,806 | 12/1966 | Maag | 56/328 R X |
| 3,331,197 | 7/1967 | O'Brien | 56/327 R |
| 3,698,169 | 10/1972 | Simpson | 56/328 R |

FOREIGN PATENTS OR APPLICATIONS

| | | | |
|---|---|---|---|
| 209,885 | 7/1968 | U.S.S.R. | 56/327 R |

*Primary Examiner*—Russell R. Kinsey
*Attorney, Agent, or Firm*—Harris, Kern, Wallen & Tinsley

[57] ABSTRACT

An apparatus for picking up melons lying on the ground, comprising: a frame; wheels supporting the frame; an upwardly and rearwardly sloping concave ramp carried by the frame and up which the melons are adapted to be rolled, the front end of the ramp being substantially at ground level; a melon pickup mechanism for rolling the melons up the ramp, comprising laterally spaced, coaxial tires mounted on the frame above the ramp for rotation about a transverse horizontal axis, the tires being above ground level and being engageable with melons on the ground ahead of the ramp to start the melons rolling rearwardly before they engage the front end of the ramp; a drive on the frame for driving the tires in a direction to cause them to roll the melons toward the front end of and up the ramp; and a transverse melon receiving conveyor at the rear end of the ramp.

6 Claims, 4 Drawing Figures

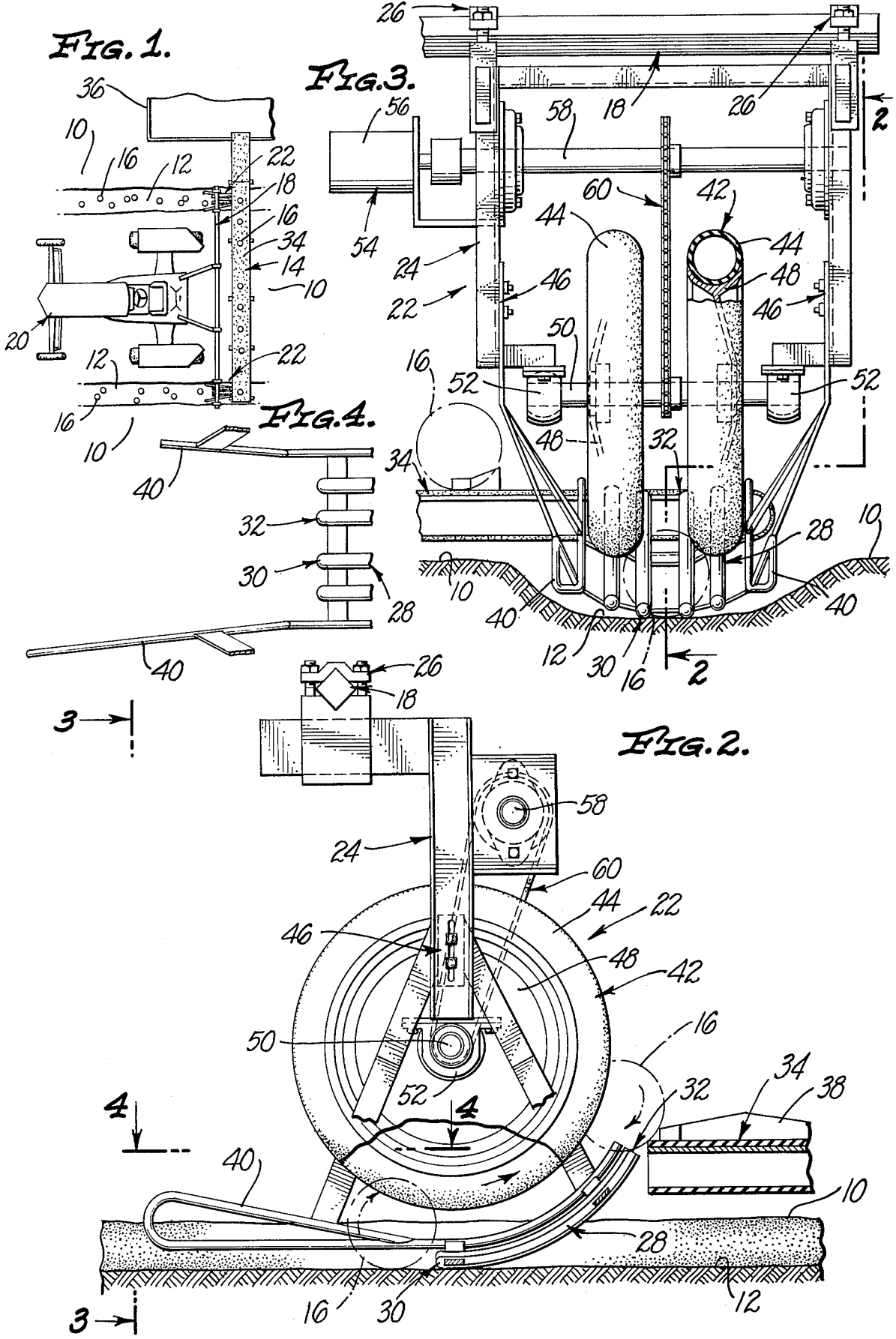

MELON HARVESTER

BACKGROUND OF INVENTION

The present invention relates in general to a melon harvester and, more particularly, to a harvester for generally spherical melons, such as cantaloupes, honeydew melons, casabas, and the like, although the invention may be utilized for harvesting other, similar products.

Melons are customarily grown on relatively wide, flat hills or ridges having irrigation ditches therebetween. At harvest time, workers go through the field picking the melons which are ready for harvest and rolling them into the ditches between the hills. The present invention relates to an apparatus for picking up such harvested melons and for delivering them to a truck, or other means of transport.

Still more particularly, the present invention relates to an apparatus for picking up melons lying on the ground, comprising: a frame; wheeled means for supporting the frame; upwardly and rearwardly sloping means carried by the frame for conveying the melons upwardly and rearwardly to a melon receiving means, such as a transverse conveyor leading to a truck, or other melon transporting means; and means for delivering the melons to the melon conveying means, comprising laterally spaced coaxial tires mounted on the frame and engageable with the melons on the ground and adapted to roll them rearwardly.

SUMMARY AND OBJECTS OF INVENTION

A general object of the invention is to provide a melon pickup apparatus of the foregoing nature which is an improvement on prior apparatuses.

More particularly, the invention may be summarized as including, and a primary object of the invention is to provide a melon harvester which includes: an upwardly and rearwardly sloping ramp carried by the frame of the apparatus and up which melons are adapted to be rolled, the front end of the ramp being substantially at ground level; means for rolling the melons up the ramp and delivering them to the melon receiving means at the rear of the ramp, comprising laterally spaced, coaxial tires mounted on the frame above the ramp for rotation about the transverse horizontal axis, the tires being above ground level and being engageable with the melons on the ground; and drive means on the frame for driving the tires in a direction to cause them to roll the melons toward the front end of and up the ramp.

With the foregoing construction, the tires are clear of the ground at all times, and frictional engagement of the tires with the ground is not relied on to drive the tires. Consequently, the tires rotate at all times and cannot encounter any obstructions which might cause skidding of the tires. Further, having the tires spaced above ground level minimizes any tendency of the melon vines to become entangled in the apparatus.

Another important object of the invention is to provide a ramp which is curved substantially about the axis of rotation of the tires in the fore-and-aft direction so that the tires act to roll the melons up the ramp and discharge them at the rear end thereof, no separate conveyor being necessary.

Still another important object is to provide a construction wherein the tires project forwardly of the front end of the ramp sufficiently so as to engage the melons on the ground, and start them rolling rearwardly, before such melons engage the front end of the ramp, whereby the tires roll the melons rearwardly onto the ramp. In other words, the melons are not scooped up by the ramp, thereby minimizing any possibility of damage to the melons. A related object is to provide a construction wherein the front end of the ramp is substantially directly below the axis of rotation of the tires.

Yet another object is to provide laterally spaced, forwardly and outwardly extending guides projecting forwardly from the ramp for guiding melons rearwardly to the front end of the ramp.

The foregoing objects, advantages, features and results of the present invention, together with various other objects, advantages, features and results thereof which will be evident to those skilled in the melon harvesting art, or the like, in the light of this disclosure, may be achieved with the exemplary embodiment of the invention illustrated in the accompanying drawing and described in detail hereinafter.

DESCRIPTION OF DRAWING

FIG. 1 is a plan view on a reduced scale showing two tractor supported and propelled melon harvesting units of the invention in conjunction with a transverse conveyor for transporting the melons to a bin on a truck, or similar vehicle;

FIG. 2 is a side elevational view of a melon harvesting unit or apparatus of the invention on an enlarged scale;

FIG. 3 is a front elevational view of the melon harvesting apparatus and is taken as indicated by the arrowed line 3—3 of FIG. 2; and FIG. 4 is a fragmentary sectional view taken as indicated by the arrowed line 4—4 of FIG. 2 of the drawing.

DESCRIPTION OF EXEMPLARY EMBODIMENT OF INVENTION

Referring initially to FIG. 1 of the drawing, illustrated therein are ridges or hills 10 on which melons are grown, such ridges being separated by relatively wide irrigation ditches or furrows 12. As previously mentioned, it is conventional for workers to go through a field and pick melons which are ready for harvest from vines growing on the ridges 10, the picked melons being rolled into the furrows 12.

The invention comprises a harvester, designated generally by the numeral 14, for picking up the melons in the furrows 12, such melons being indicated by the numeral 16.

In the particular construction illustrated, the harvester 14 comprises a supporting frame 18 shown as mounted on a tractor 20. However, it will be understood that the harvester may be mounted on any suitable wheeled supporting means, other than the tractor 20.

The frame 18 is shown as carrying two units 22 for picking up melons lying in the respective rows 12. It will be understood, of course, that the harvester 14 may comprise any desired number of the units 22. The two units 22 are identical and only one of them will be considered hereinafter.

Referring to FIGS. 2 to 4 of the drawing, the melon pickup unit or apparatus 22 shown therein comprises a subframe 24 mounted on the frame 18, the latter being shown simply as a transverse noncircular bar. The subframe 24 is secured to the frame 18 by clamps 26 so that the lateral position of the pickup unit 22 can be adjusted to accommodate a particular spacing of the furrows 12. Carried by the subframe 24 at the lower end thereof is an upwardly and rearwardly sloping ramp 28 up which the melons 16 are adapted to be rolled from the front end 30 of the ramp to the rear end 32 thereof, the melons being discharged from the rear end of the ramp onto a melon receiving means which is shown simply as a transverse conveyor 34 leading to a bin 36 on a truck, or the like, not shown, traveling alongside the tractor 20. Preferably, the terminal portion of the transverse conveyor 34 slopes upwardly to the top of the bin 36 and, to keep the melons 16 from rolling back down such upwardly sloping portion, the conveyor is provided with cleats one of which is designated by the numeral 38 in FIG. 2 of the drawing.

The ramp 28 is preferably of open construction, as will be clear from FIGS. 2, 3 and 4, to minimize the possibility of picking up clods of dirt, or other foreign matter. The front end 30 of the ramp 28 rides substantially on the ground at the bottom of the corresponding furrow 12. The ramp 28 is provided with laterally spaced, forwardly and outwardly extending guides 40 projecting forwardly from the front end 30 of the ramp for centering the melons 16 in the corresponding furrow 12 relative to the front end of the ramp.

Also mounted on the subframe 24 is a means 42 for rolling the melons 16 rearwardly along the ground and onto the ramp 28, such pickup means thereafter rolling the melons upwardly and rearwardly along the ramp and discharging same onto the melon receiving means represented by the transverse conveyor 34.

The means 42 comprises laterally spaced, coaxial tires 44 mounted on the subframe 24 above the ramp 28 for rotation about a transverse horizontal axis, the tires being above the level of the bottom of the corresponding furrow 12 as will be clear from FIG. 2 of the drawing. The tires 44 are spaced apart a distance considerably less than the average diameter of the melons 26 to be picked up. If desired, means, not shown, may be provided for varying the lateral spacing of the tires 44 to accommodate melons of different sizes. Similarly, the vertical position of the tires 44 relative to the ramp 28 may be adjusted by an adjustment means 46 to accommodate melons of different sizes.

The tires 44 are carried by wheels 48 mounted on a transverse horizontal shaft 50 carried by bearings 52 on the subframe 24.

It will be noted that the ramp 28 is upwardly and forwardly concave, and that its center of curvature substantially coincides with the axis of rotation of the tires 44. Thus, not only do the tires roll the melons 16 rearwardly onto the ramp 28, but they roll the melons upwardly and rearwardly along the ramp until they are discharged from the rear end 32 thereof. Thus, it is not necessary to provide the ramp 28 with any auxiliary conveying means, the tires 44 themselves acting as the conveying means. With this construction, the structure of the ramp 28 is extremely simple, which is an important feature. It will also be noted that the tires 44 engage each melon 16, and start it rolling rearwardly, before the melon engages the front end 30 of the ramp 28. Thus, the melons 16 are rolled upwardly over the front end 30 of the ramp 28, and are not scooped up by the ramp, thereby minimizing the possibility of damage. To insure engagement of each melon 16 by the tires 44 before such melon encounters the front end 30 of the ramp 28, the tires project forwardly of the front end of the ramp a considerable distance. Preferably, the front end 30 of the ramp 28 is located approximately directly below the axis of rotation of the tires 44 to achieve this result.

The pickup unit 22 includes a drive means 54 on the subframe 24 for driving the tires 44 in a direction to cause them to roll the melons 16 toward the front end 30 of and up the ramp 28, there being no reliance on frictional engagement with the ground to achieve tire rotation. The drive means 54 may comprise the hydraulic motor 56 supplied by a pump, not shown, on the tractor 20. The hydraulic motor 56 drives a transverse horizontal shaft 58 which, in turn, drives the tire shaft 50 through a belt-and-pulley connection 60. This positive drive for the tires 44 insures that they will perform their desired function at all times, as opposed to prior art constructions wherein the pickup tires are in contact with the ground and rely on frictional engagement with the ground to drive them. Also, with the present construction, there is less likelihood of entanglement with the melon vines.

Although an exemplary embodiment of the invention has been disclosed for illustrative purposes, it will be understood that various changes, modifications and substitutions may be incorporated in such embodiment without departing from the invention as hereinafter claimed.

I claim as my invention:

1. In an apparatus for picking up melons lying on the ground, the combination of:
   a. a frame;
   b. wheeled means for supporting said frame;
   c. an upwardly and rearwardly sloping ramp carried by said frame and up which melons are adapted to be rolled, the front end of said ramp being substantially at ground level;
   d. means for rolling the melons up said ramp, comprising laterally spaced, coaxial tires mounted on said frame above said ramp for rotation about a transverse horizontal axis, the lowermost portions of said tires being spaced above said ramp and being above ground level and being engageable with the melons on the ground;
   e. drive means on said frame for driving said tires in a direction to cause them to roll the melons toward the front end of and up said ramp; and
   f. melon receiving means at the rear end of said ramp.

2. An apparatus according to claim 1 wherein said ramp is curved substantially about the axis of rotation of said tires in the fore-and-aft direction.

3. An apparatus according to claim 2 including laterally spaced, forwardly and outwardly extending guides projecting forwardly from said ramp for guiding the melons to the front end of said ramp.

4. An apparatus as defined in claim 2 wherein said tires project forwardly of the front end of said ramp so as to engage the melons on the ground, and start them rolling rearwardly, before such melons engage the front end of said ramp.

5. An apparatus as set forth in claim 4 wherein the front end of said ramp is approximately directly below the axis of rotation of said tires.

6. An apparatus as set forth in claim 2 wherein said melon receiving means comprises a transverse conveyor onto which the melons are rolled from the rear end of said ramp by said tires.

* * * * *